Patented Oct. 30, 1928.

1,689,356

UNITED STATES PATENT OFFICE.

HANS MEERWEIN, OF KONIGSBERG IN PRUSSIA, GERMANY, ASSIGNOR TO CHEMISCHE FABRIK AUF ACTIEN (VORM. E. SCHERING), OF BERLIN, GERMANY.

METHOD OF PRODUCING COMPLEX METAL ALCOHOLATES.

No Drawing. Application filed November 1, 1926, Serial No. 145,711, and in Germany November 12, 1925.

My invention refers to the production of alcoholates and more especially to complex alcoholates of the metals.

I have ascertained that, contrary to what could be expected, the alcoholates of different metals, if allowed to act upon each other, combine to form complex metal alcoholates. Thus, for instance, if aluminium ethylate and magnesium ethylate are made to react with each other, there are obtained, according to the proportion in which the two substances are employed, two compounds in which the relation of aluminium to magnesium is 2:1 and 1:1½, respectively. These compounds can be considered to be complex magnesium-aluminium ethylates in which the aluminium is coordinatively tetravalent and hexavalent, respectively, according to the formulas $(Al(OC_2H_5)_4)_2Mg$ and $(Al(OC_2H_5)_6)_2Mg_3$.

In a similar manner magnesium or aluminium ethylate and sodium ethylate will combine to form different complex magnesium-sodium ethylates and aluminium-sodium ethylates, respectively.

All these complex alcoholates are distinguished by being remarkably soluble in organic solvents. While magnesium ethylate is altogether insoluble in alcohol and all other organic solvents, the complex magnesium-sodium ethylates dissolve readily in warm alcohol, xylol, and ether. Magnesium-aluminium ethylate having the formula $(Al(OC_2H_5)_4)_2Mg$ is even soluble in the cold with great facility in all inert organic solvents including petroleum ether, and can even be distilled in vacuo without suffering any remarkable decomposition. Therefore, if mixed in suitable proportions these complex metal alcoholates will form condensing agents readily soluble in organic solvents and having a degree of alkalinity which can be varied as required.

These complex metal alcoholates can be produced according to the following methods, namely:

1. By heating a mixture of metal alcoholates, preferably in the presence of suitable solvents.

2. By acting with a metal alcoholate in the presence of alcohol on another metal capable of reacting with alcohol under formation of alcoholates.

3. By acting with alcohol upon a mixture of two such metals or upon an alloy of such metals, if desired in the presence of a suitable solvent.

4. By acting with a metal salt upon an alkali alcoholate in alcoholic solution, the quantity of metal alcoholate employed being in excess of the calculated quantity.

*Example 1.*—A mixture of 1 mol magnesium ethylate free of alcohol (produced according to Meerwein and Schmidt, Liebig's Annalen 444, 236 (1925) and 2 mols aluminium ethylate is heated with the threefold to fourfold of xylol or some other inert solvent. The magnesium ethylate, which under other conditions is altogether insoluble, is gradually dissolved. The aluminium-magnesium ethylate remaining over after the solvent has been distilled off solidifies quickly. It is readily soluble in all inert solvents.

*Example 2.*—7.2 grams (equal to 1 atom) of magnesium turnings are placed into 138 ccms. of absolute alcohol and 13.8 grams of metallic sodium are quickly introduced into the liquid. When the greatest part of the sodium metal has been dissolved and more especially if the alcohol is slightly heated, the magnesium will also gradually dissolve. When the reaction becomes more vigorous another 72 ccms. of alcohol are added, whereby the dissolution of the magnesium is quickly completed. After some heating 200 ccms. benzene are added and the hot mixture is filtered. In the filtrate, from which part of the solvent may previously be removed by distillation, the magnesium-sodium ethylate separates in large transparent crystals which contain crystal alcohol.

*Example 3.*—27 grams (equal to 2 atoms) aluminium grit and 12 grams (equal to 1 atom) magnesium turnings are immersed in a mixture of 80 ccms. of benzene and 20 ccms. alcohol, and a small quantity of mercuric chloride and iodine is added. The reaction sets in very vigorously either directly or after slight heating and takes place at first without requiring any external heat. When the reaction slackens down, a mixture of 280 ccms. alcohol and 200 ccms. benzene is gradually added under slight heating. When all the metal has been dissolved, the hot mixture, to which some benzene may previously be added, is passed through a filter. From the limpid filtrate benzene and the alcohol in excess are separated by distillation, towards the end in vacuo. The remaining aluminium-magnesium ethylate solidifies directly on cooling. The same mode of production can be adopted if other solvents such as alcohol, xylol, and acetic ether are used.

Magnesium-aluminium ethylates having similar properties are obtained if the quantity of magnesium according to the preceding example is increased up to 1½ atoms of magnesium per atom of aluminium. If a greater quantity of magnesium is used, undissolved magnesium ethylate will remain over. The metals can be replaced by their alloys without any change in the results.

*Example 4.*—To a solution of 4.6 grams of sodium in 90 ccms. of absolute alcohol are added 6.7 grams of aluminium chloride. After slight heating a vigorous reaction occurs and sodium chloride separates out. The reaction is completed by boiling for some time, whereupon the hot solution is separated from the salt by filtration. 100 ccms. xylol are now added to the filtrate and the alcohol is separated from the limpid solution by distillation until the boiling point of xylol has been reached. A great quantity of sodium-aluminium ethylate will separate out, partly in the heat, from the xylol solution.

Various changes may be made in the details of the operation and particularly in the proportions of the ingredients present in the solutions used without departing from the invention or sacrificing the advantages thereof.

I claim:—

1. The process of producing readily soluble complex metal alcoholates, comprising causing the alcoholates of different metals to react with each other.

2. The process of producing readily soluble complex metal alcoholates, comprising causing the alcoholates of different metals to react with each other in statu nascendi.

3. The process of producing readily soluble complex metal alcoholates, comprising causing the alcoholates of different metals to react with each other in the presence of an inert solvent.

4. The process of producing readily soluble complex metal alcoholates, comprising causing the alcoholates of different metals to react with each other in statu nascendi in the presence of an inert solvent.

5. The process of producing readily soluble complex metal alcoholates, comprising causing a metal alcoholate to act in the presence of alcohol on another metal capable of reacting with alcohol under formation of alcoholates.

6. The process of producing readily soluble complex metal alcoholates, comprising causing alcohol to act on a mixture of two metals capable of reacting with alcohol under formation of alcoholates.

7. The process of producing readily soluble complex metal alcoholates, comprising causing alcohol to act on an alloy of metals capable of reacting with alcohol under formation of alcoholates.

8. The process of producing readily soluble complex metal alcoholates, comprising causing alcohol to act in the presence of an inert solvent on a mixture of two metals capable of reacting with alcohol under formation of alcoholates.

9. The process of producing readily soluble complex metal alcoholates, comprising causing alcohol to act in the presence of an inert solvent on an alloy of metals capable of reacting with alcohol under formation of alcoholates.

10. The process of producing readily soluble complex metal alcoholates, comprising causing one molecule of magnesium ethylate to react with two molecules of aluminium ethylate in the presence of an inert solvent.

11. The process of producing readily soluble complex metal alcoholates, comprising causing the equivalent of two atoms of aluminium and at least one atom of magnesium to react with each other in the presence of alcohol, benzene and mercuric chloride.

In testimony whereof I affix my signature.

HANS MEERWEIN.